United States Patent
Fujita et al.

(10) Patent No.: US 10,562,215 B2
(45) Date of Patent: *Feb. 18, 2020

(54) WATER JACKET SPACER PRODUCTION METHOD

(71) Applicant: NICHIAS CORPORATION, Tokyo (JP)

(72) Inventors: Yoshifumi Fujita, Tokyo (JP); Shota Uchida, Tokyo (JP); Kenichi Nakamura, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 256 days.

This patent is subject to a terminal disclaimer.

(21) Appl. No.: 15/543,638

(22) PCT Filed: Jan. 14, 2016

(86) PCT No.: PCT/JP2016/050900
§ 371 (c)(1),
(2) Date: Jul. 14, 2017

(87) PCT Pub. No.: WO2016/114333
PCT Pub. Date: Jul. 21, 2016

(65) Prior Publication Data
US 2018/0009145 A1    Jan. 11, 2018

(30) Foreign Application Priority Data

Jan. 16, 2015 (JP) ................................ 2015-006452
Dec. 16, 2015 (JP) ................................ 2015-245456

(51) Int. Cl.
*B29C 45/33* (2006.01)
*F01P 3/02* (2006.01)
(Continued)

(52) U.S. Cl.
CPC .............. *B29C 45/33* (2013.01); *B29C 45/27* (2013.01); *B29C 45/28* (2013.01); *B29C 45/40* (2013.01);
(Continued)

(58) Field of Classification Search
None
See application file for complete search history.

(56) References Cited

U.S. PATENT DOCUMENTS

2005/0120653 A1   6/2005   Okazaki et al.
2009/0194046 A1   8/2009   Shikida et al.
2011/0114041 A1   5/2011   Hamakawa et al.

FOREIGN PATENT DOCUMENTS

CN              1316156 C       5/2007
DE    10 2013 207 955 A1      10/2014
(Continued)

OTHER PUBLICATIONS

Office Action dated Oct. 19, 2018, issued in counterpart Chinese Application No. 201680006028.3, with English translation. (18 pages).

(Continued)

*Primary Examiner* — Monica A Huson
(74) *Attorney, Agent, or Firm* — Westerman, Hattori, Daniels & Adrian, LLP; Stephen B. Parker

(57) ABSTRACT

A resin material is injection-molded using an injection mold in which a resin flow channel is designed so that a plurality of gates are provided along a longitudinal direction at a position corresponding to an inner circumferential surface of a spacer, to obtain a molded product, the spacer having a shape that a plurality of arc-shaped circumferential surfaces are linked through a constricted part. The molded product is cooled in a state in which a runner that is connected to the gates is allowed to remain, and the runner is cut off thereafter. A water jacket spacer is produced by injection molding while achieving excellent moldability, the water jacket spacer being disposed in a water jacket, and controlling the flow of a coolant, the water jacket spacer including a (Continued)

plurality of segments, or having a shape that the water jacket spacer can be partially inserted into the water jacket.

12 Claims, 8 Drawing Sheets

(51) Int. Cl.
- *F02F 1/14* (2006.01)
- *B29C 45/27* (2006.01)
- *B29C 45/28* (2006.01)
- *B29C 45/40* (2006.01)
- *B29C 45/72* (2006.01)
- *B29L 31/00* (2006.01)

(52) U.S. Cl.
CPC ............ *B29C 45/7207* (2013.01); *F01P 3/02* (2013.01); *F02F 1/14* (2013.01); *B29L 2031/748* (2013.01); *B29L 2031/749* (2013.01); *F01P 2003/021* (2013.01)

(56) References Cited

FOREIGN PATENT DOCUMENTS

| | | |
|---|---|---|
| EP | 0 783 952 A1 | 7/1997 |
| JP | H4-175126 A | 6/1992 |
| JP | 6-173675 A | 6/1994 |
| JP | 2005-105878 A | 4/2005 |
| JP | 2005-120949 A | 5/2005 |
| JP | 2008-31939 A | 2/2008 |
| JP | 2010-194780 A | 9/2010 |
| JP | 2012-36742 A | 2/2012 |
| JP | 2012-101524 A | 5/2012 |
| JP | 2015-222071 A | 12/2015 |

OTHER PUBLICATIONS

International Search Report dated Apr. 12, 2016, issued in counterpart International Application No. PCT/JP2016/050900 (2 pages).
Extended (Supplementary) European Search Report dated Aug. 24, 2018, issued in counterpart application No. 16737404.0. (6 pages).

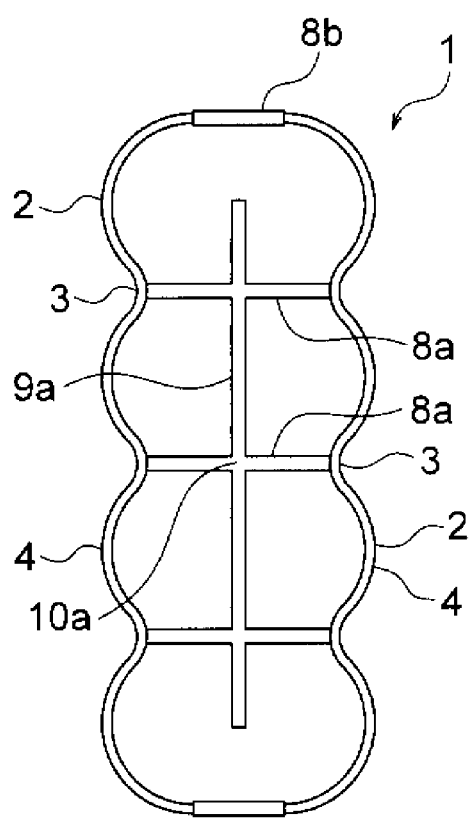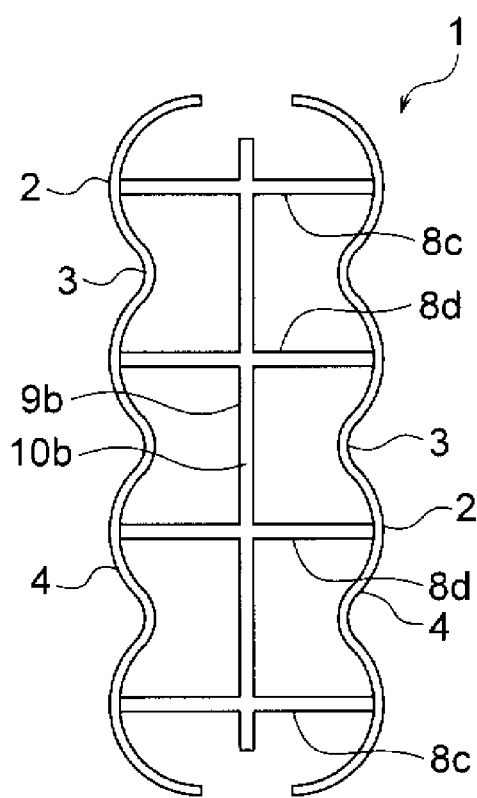

WATER JACKET SPACER PRODUCTION METHOD

TECHNICAL FIELD

The present invention relates to a method for producing a water jacket spacer that is disposed in a water jacket provided to a water-cooled internal combustion engine.

BACKGROUND ART

A water-cooled internal combustion engine such as an automotive water-cooled engine is designed so that a water jacket (i.e., coolant circulating path) is formed around a cylinder bore wall. A spacer (water jacket spacer) is normally inserted into the water jacket to control the flow of the coolant.

The water jacket spacer is normally produced by injection-molding a specific resin material. Patent Literature 1 discloses a water jacket spacer that consists of a plurality of segments.

The flow of the coolant that flows through the water jacket may be controlled, and the temperature distribution of the bore wall may be optimized by disposing the water jacket spacer in the water jacket on the side on which the coolant enters the water jacket, without disposing the water jacket spacer on the side on which the coolant is discharged from the water jacket, for example. In such a case, the water jacket spacer is molded to have such a shape that the water jacket spacer can be partially inserted into the water jacket.

CITATION LIST

Patent Literature

Patent Literature 1: JP-A-2005-120949

SUMMARY OF INVENTION

Technical Problem

An object of the invention is to provide a method for producing a water jacket spacer that can produce a water jacket spacer by injection molding while achieving excellent moldability, the water jacket spacer being disposed in a water jacket, and controlling the flow of a coolant, the water jacket spacer consisting of a plurality of segments (segmented molded products), or having such a shape that the water jacket spacer can be partially inserted into the water jacket.

Solution to Problem

According to one aspect of the invention, a method for producing a water jacket spacer produces a water jacket spacer that is disposed in a water jacket provided to a water-cooled internal combustion engine, and controls a flow of a coolant, the water jacket spacer having such a shape that a plurality of arc-shaped circumferential surfaces are linked through a constricted part so that the water jacket spacer can be partially inserted into the water jacket, the method including injection-molding a specific resin material using an injection mold in which a resin flow channel is designed so that a plurality of gates are provided along a longitudinal direction at a position that corresponds to an inner circumferential surface of the water jacket spacer, to obtain a molded product, wherein, after opening the injection mold, and ejecting the molded product, the molded product is cooled in a state in which a runner that is connected to the gates is allowed to remain, and the runner is cut off thereafter.

According to another aspect of the invention, a method for producing a water jacket spacer produces a water jacket spacer that is disposed in a water jacket provided to a water-cooled internal combustion engine, and controls a flow of a coolant, the water jacket spacer including a plurality of segmented molded products in which a plurality of arc-shaped circumferential surfaces are linked through a constricted part, the method including injection-molding a specific resin material using an injection mold in which a resin flow channel is designed so that a plurality of gates are provided along a longitudinal direction at a position that corresponds to an inner circumferential surface of the water jacket spacer, to obtain a molded product, wherein, after opening the injection mold, and ejecting the molded product, the molded product is cooled in a state in which a runner that is connected to the gates is allowed to remain, and the runner is cut off thereafter.

According to a further aspect of the invention, a method for producing a water jacket spacer produces a water jacket spacer that is disposed in a water jacket provided to a water-cooled internal combustion engine, and controls a flow of a coolant, the water jacket spacer having such a shape that a plurality of arc-shaped circumferential surfaces are linked through a constricted part so that the water jacket spacer can be partially inserted into the water jacket, the method including injection-molding a specific resin material using an injection mold in which a resin flow channel is designed so that a space for molding two water jacket spacers is formed, and a plurality of bridges are provided along a longitudinal direction, the two water jacket spacers having an identical or different shape so that inner circumferential surfaces thereof face each other, the plurality of bridges being provided at a position that corresponds to the inner circumferential surfaces of the two water jacket spacers, to obtain a molded product, wherein, after opening the injection mold, and ejecting the molded product, the molded product is cooled in a state in which the plurality of bridges are allowed to remain, and the plurality of bridges are cut off thereafter.

Advantageous Effects of Invention

The aspects of the invention can thus produce a water jacket spacer by injection molding while preventing the deformation of the water jacket spacer during the cooling step that is performed after molding, and achieving high productivity, the water jacket spacer consisting of a plurality of segmented molded products, or having such a shape that the water jacket spacer can be partially inserted into the water jacket.

BRIEF DESCRIPTION OF DRAWINGS

FIGS. 7K and 7M each is a view illustrating another example of a water jacket spacer produced in accordance with one embodiment of the invention.

DESCRIPTION OF EMBODIMENTS

A method for producing a water jacket spacer according to a first embodiment of the invention produces a water jacket spacer that is disposed in a water jacket provided to a water-cooled internal combustion engine, and controls the flow of a coolant, the water jacket spacer having such a shape that a plurality of arc-shaped circumferential surfaces are linked through a constricted part so that the water jacket spacer can be partially inserted into the water jacket, the method including injection-molding a specific resin material using an injection mold in which a resin flow channel is designed so that a plurality of gates are provided along a longitudinal direction at a position that corresponds to the inner circumferential surface of the water jacket spacer, to obtain a molded product, wherein, after opening the injection mold, and ejecting the molded product, the molded product is cooled in a state in which a runner that is connected to the gates is allowed to remain, and the runner is cut off thereafter.

The method for producing a water jacket spacer according to the first embodiment of the invention is described below with reference to the drawings.

Figure 3:
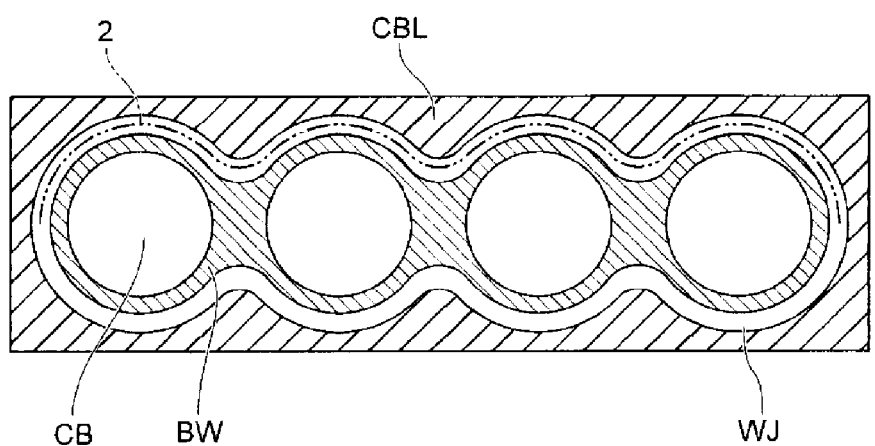
FIG. 3 is a view illustrating an example of an internal combustion engine that is provided with a water jacket spacer produced in accordance with one embodiment of the invention.

As illustrated in FIG. 3, a spacer 2 that is produced using the method for producing a water jacket spacer according to the first embodiment of the invention is disposed in a water jacket WJ that is provided to an automotive water-cooled inline four-cylinder engine that includes a cylinder block CBL and a cylinder head (not illustrated in the drawings), wherein four cylinder bores CB provided in series are formed in the cylinder block CBL.

A bore wall BW that defines a plurality of (four in the example illustrated in FIG. 3) cylinder bores CB is integrally (continuously) formed in the cylinder block CBL so as to be constricted between the adjacent cylinder bores CB, and the water jacket WJ (i.e., coolant circulating path) is formed around the bore wall BW.

Note that FIG. 3 is a view illustrating an example of the water-cooled internal combustion engine in which the spacer 2 is disposed. In FIG. 3, the spacer 2 is indicated by the two-dot chain line.

The spacer 2 is designed so that the spacer 2 can be inserted into the water jacket WJ so as to be disposed along the bore wall BW that is constricted between the adjacent cylinder bores CB, and controls the flow of the coolant that flows within the water jacket WJ to optimize the temperature distribution of the bore wall BW. For example, the spacer 2 is designed to have a shape that allows the spacer 2 to be partially inserted into the water jacket WJ when the spacer 2 is disposed in the water jacket WJ on the side on which the coolant enters the water jacket WJ, and is not disposed on the side on which the coolant is discharged from the water jacket WJ. The method for producing a water jacket spacer according to the first embodiment of the invention produces the spacer 2 having such a shape.

Figure 1:
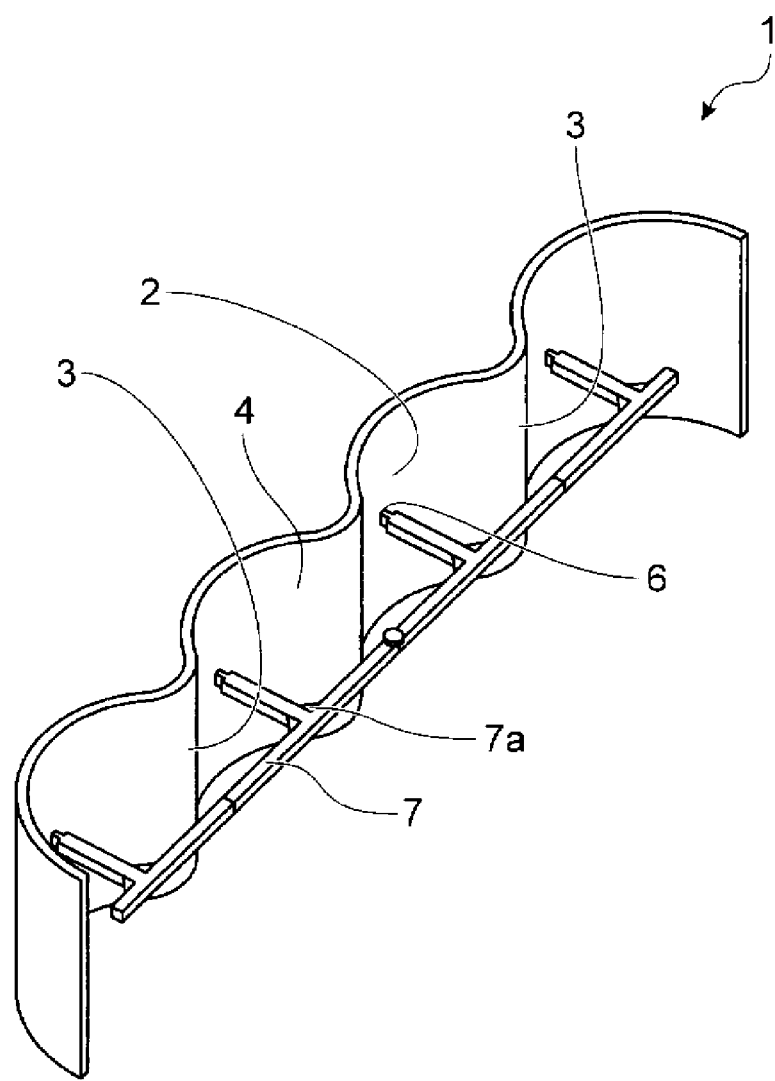
FIG. 1 is a perspective view schematically illustrating an example of a water jacket spacer produced in accordance with one embodiment of the invention.
Figure 2:
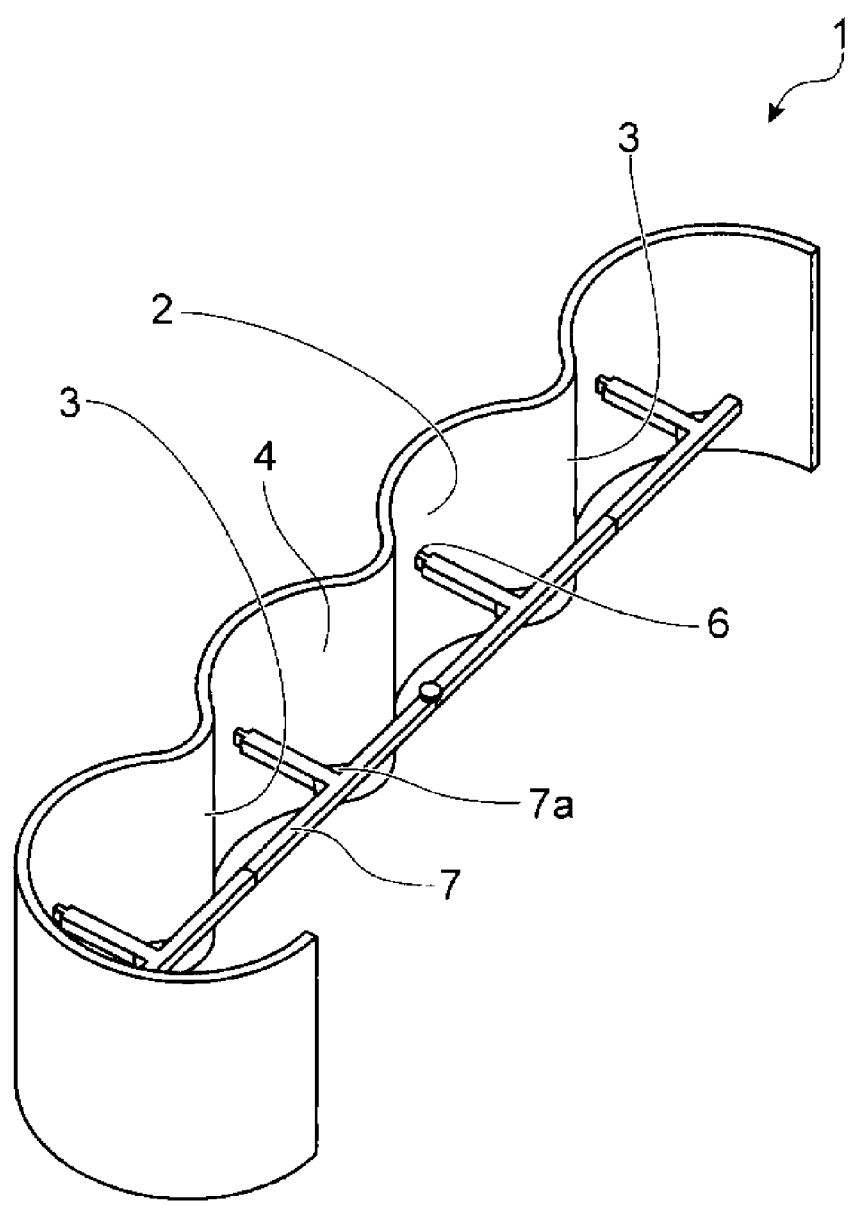
FIG. 2 is a perspective view schematically illustrating another example of a water jacket spacer produced in accordance with one embodiment of the invention.

The spacer 2 may have a shape in which one end and the other end are symmetrical (see FIG. 1), or may have a shape in which one end and the other end are unsymmetrical (e.g., one end is longer than the other end) (see FIG. 2). It suffices that the spacer 2 have such a shape that a plurality of arc-shaped sidewalls 4 are linked through a constricted part 3 so that the spacer 2 can be inserted into the water jacket WJ along the bore wall BW that defines the cylinder bores CB.

The spacer 2 having such a shape is formed by injection-molding a specific resin material using an injection mold in which a resin flow channel is designed so that a plurality of gates 6 through which a cavity is filled with the resin material are provided along the longitudinal direction at a position that corresponds to the inner circumferential surface (i.e., a surface situated opposite to the bore wall BW when the spacer 2 is disposed in the water jacket WJ) of the spacer 2. A molded product 1 obtained by injection molding includes at least the spacer 2, the gates 6, and a runner 7.

After opening the injection mold, and ejecting the molded product 1, the molded product 1 is cooled in a state in which the runner 7 that is connected to the gates 6 in a comb-like configuration is allowed to remain, and the runner 7 is cut off thereafter.

According to this configuration, the runner 7 that is connected to the inner circumferential surface of the sidewall 4 of the spacer 2 in a comb-like configuration prevents the deformation of the spacer 2 that is in a softened state immediately after ejection, and maintains the shape of the spacer 2 while the spacer 2 is cooled and solidified. An angle brace-like reinforcement member 7a (see FIGS. 1 and 2) may be provided to the branch area of the runner 7 so that the runner 7 that is connected to the sidewall 4 of the spacer 2 in a comb-like configuration reliably maintains the shape of the spacer 2.

The runner 7 that is connected to the sidewall 4 of the spacer 2 in a comb-like configuration is cut off after the spacer 2 has been sufficiently solidified so that the spacer 2 is not deformed.

According to the first embodiment, it is possible to produce the spacer by injection molding with high productivity while preventing the deformation of the spacer 2 during the cooling step that is performed after molding.

In the examples illustrated in FIGS. 1 and 2, the gates 6 are provided at a position that corresponds to the center of the sidewall 4 of the spacer 2 in the height direction. This makes it possible to more effectively prevent the deformation of the spacer 2 during the cooling step that is performed after molding. Note that the position with respect to the sidewall 4 in the height direction at which the gates 6 are provided is not limited thereto as long as the shape of the spacer 2 can be maintained.

Figure 4A:
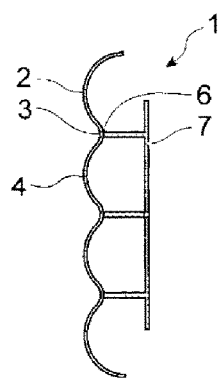
FIGS. 4A through 4H each is a view illustrating another example of a water jacket spacer produced in accordance with one embodiment of the invention.
Figure 4B:
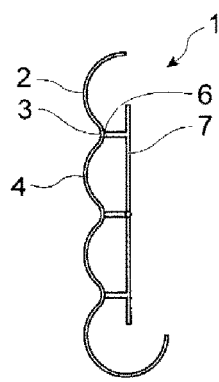
Figure 4C:
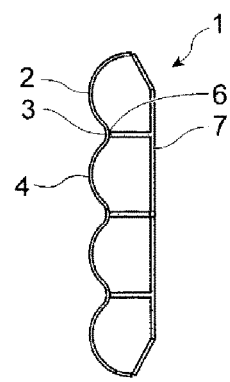
Figure 4D:
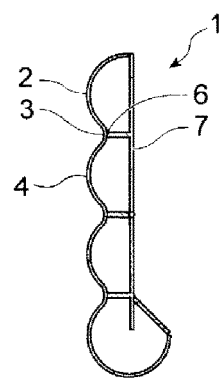
Figure 4E:
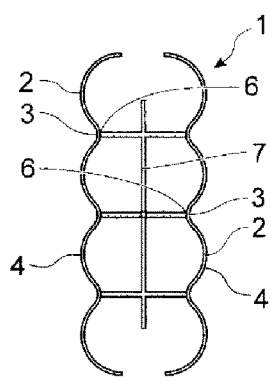

In the examples illustrated in FIGS. 1 and 2, the gates 6 are provided at a position that corresponds to the arc-shaped sidewall 4 of the spacer 2. This makes it possible to ensure that a decrease in resin pressure rarely occurs around the outlet of the gate 6, and suppress or reduce the occurrence of a short shot. On the other hand, a weld line or the like may occur around the constricted part 3 due to an insufficient flow. When it is desired to prevent a situation in which a weld line or the like occurs around the constricted part 3, the gates 6 may be provided at a position that corresponds to the constricted part 3 of the spacer 2 (see FIGS. 4A and 4B). The gates 6 may be provided at a position that corresponds to the constricted part 3 and a position that corresponds to the edge of the spacer 2 (see FIGS. 4C and 4D).

The position at which the gates 6 are provided may be appropriately designed from the viewpoint of moldability taking account of the resin flow and the like. The gates 6 may optionally be provided at a position that corresponds to the arc-shaped sidewall 4 of the spacer 2 and a position that corresponds to the constricted part 3 of the spacer 2.

It is possible to improve the productivity by producing the spacers 2 by two-shot injection molding (see FIGS. 4E to 4H).

Figure 4F:
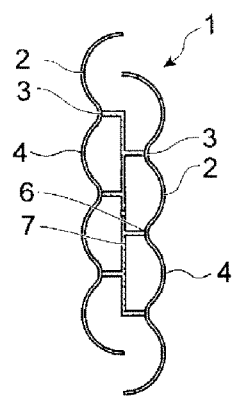
Figure 4G:
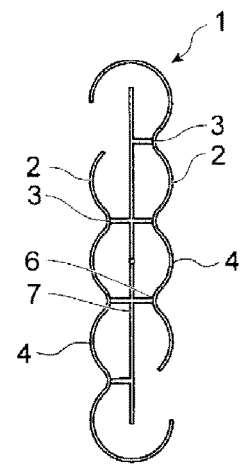
Figure 4H:
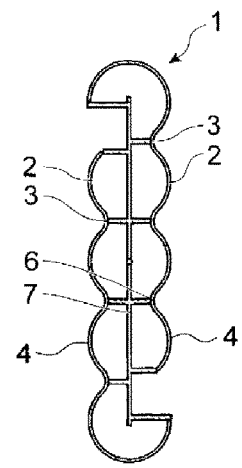

The spacers 2 may be produced by two-shot injection molding so that the gates are alternately provided to the spacers 2 along the longitudinal direction (see FIG. 4F). This makes it possible to bring the cavities used to produce the spacers 2 closer to each other while preventing a situation in which the edges of the spacers 2 interfere with each other, and reduce the length of the runner 7 to reduce the amount of resin used to produce the spacers 2.

In the examples illustrated in FIGS. 4E to 4H, the spacers 2 produced by two-shot injection molding have an identical shape. Note that the method for producing a water jacket spacer according to the first embodiment of the invention is not limited thereto. The spacers 2 produced by two-shot injection molding may have an identical shape, or may have a different shape. The spacers 2 produced by two-shot injection molding have a different shape when the spacers 2 differ from each other as to the number of arc-shaped sidewalls that form the spacer, or when the spacers 2 differ from each other as to a member that is integrally formed on the outer side of the spacer.

A method for producing a water jacket spacer according to a second embodiment of the invention produces a water jacket spacer that is disposed in a water jacket provided to a water-cooled internal combustion engine, and controls a flow of a coolant, the water jacket spacer having such a shape that a plurality of arc-shaped circumferential surfaces are linked through a constricted part so that the water jacket spacer can be partially inserted into the water jacket, the method including injection-molding a specific resin material using an injection mold in which a resin flow channel is designed so that a space for molding two water jacket spacers is formed, and a plurality of bridges are provided along a longitudinal direction, the two water jacket spacers having an identical or different shape so that inner circumferential surfaces thereof face each other, the plurality of bridges being provided at a position that corresponds to the inner circumferential surfaces of the two water jacket spacers, to obtain a molded product, wherein, after opening the injection mold, and ejecting the molded product, the molded product is cooled in a state in which the plurality of bridges are allowed to remain, and the plurality of bridges are cut off thereafter.

The method for producing a water jacket spacer according to the second embodiment of the invention is described below with reference to the drawings.

Figure 5:
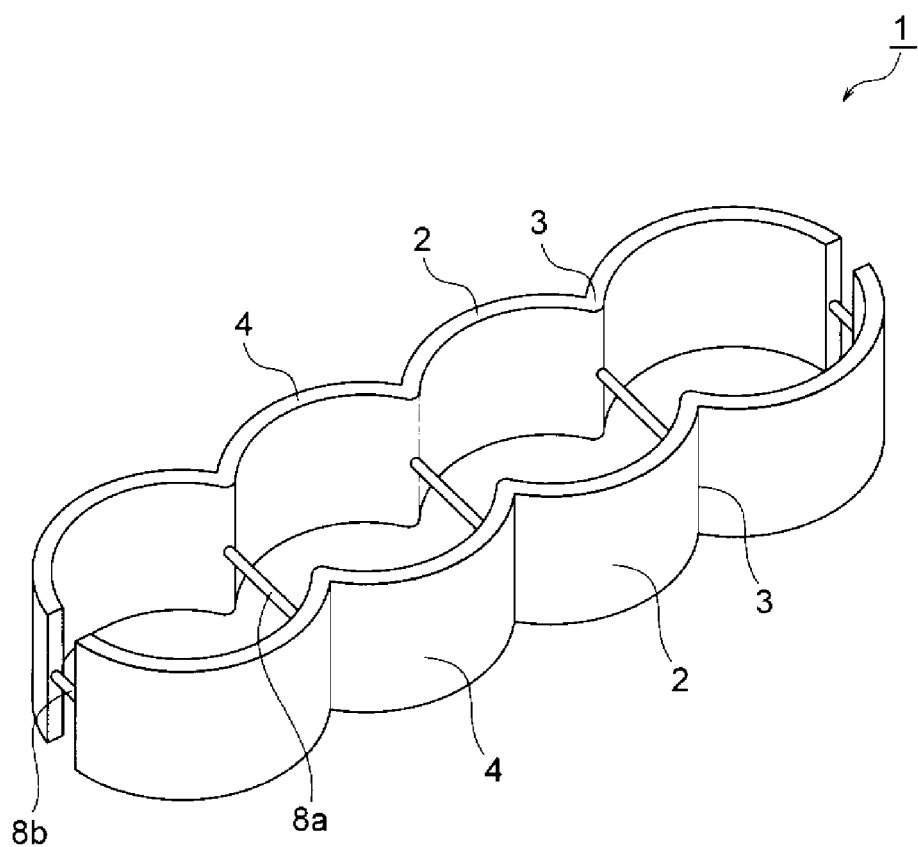
FIG. 5 is a view illustrating another example of a water jacket spacer produced in accordance with one embodiment of the invention.
Figure 6I:
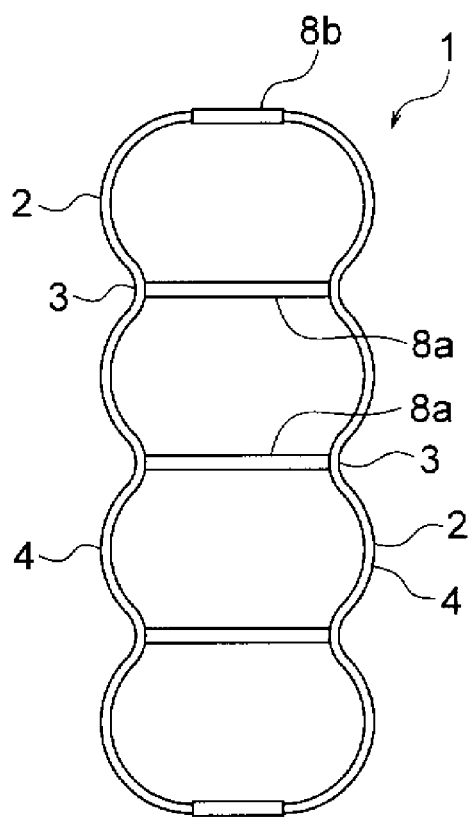
FIGS. 6I and 6J each is a view illustrating another example of a water jacket spacer produced in accordance with one embodiment of the invention.

In the example illustrated in FIGS. 5 and 6I, two spacers 2 have such a shape that a plurality of arc-shaped sidewalls 4 are linked through a constricted part 3, and face each other.

The spacers 2 are produced by injection-molding a specific resin material using an injection mold in which a resin flow channel is designed so that a plurality of bridges 8a and a plurality of bridges 8b are provided along the longitudinal direction, the plurality of bridges 8a being provided at such a position that the constricted parts 3 of the inner circumferential surfaces of the spacers 2 are linked by the bridge 8a, and the plurality of bridges 8b being provided at such a position that the ends of the spacers 2 are linked by the bridge 8b. The bridge 8a links the constricted parts of the spacers 2, and the bridge 8b links the ends of the spacers 2.

After opening the injection mold, and ejecting the resulting molded product 1, the molded product 1 is cooled in a state in which the bridges 8a and 8b are allowed to remain, and the bridges 8a and 8b are cut off thereafter.

According to this configuration, the bridges 8a and 8b that are connected to the constricted parts 3 of the spacers 2 prevent the deformation of the spacer 2 that is in a softened state immediately after ejection, and maintain the shape of the spacer 2 while the spacer 2 is cooled and solidified.

The bridges 8a and 8b that are connected to the constricted parts 3 of the spacers 2 are cut off after the spacer 2 has been sufficiently solidified so that the spacer 2 is not deformed.

In the example illustrated in FIGS. 5 and 6I, the resin material may be injected from the bridges 8b provided on the ends of the spacers 2, for example.

Figure 6J:
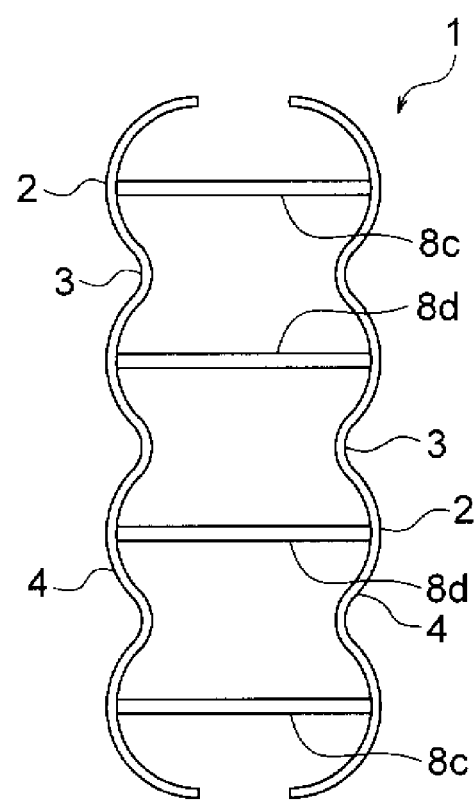

In the example illustrated in FIG. 6J, the two spacers 2 have such a shape that a plurality of arc-shaped sidewalls 4 are linked through a constricted part 3, and face each other.

The spacers 2 are produced by injection-molding a specific resin material using an injection mold in which a resin flow channel is designed so that a plurality of bridges 8a and a plurality of bridges 8b are provided along the longitudinal direction, the plurality of bridges 8a and the plurality of bridges 8b being provided around the center of the arc-shaped (when viewed from above) inner circumferential surfaces of the sidewalls 4 of the spacers 2. The bridge 8c (end-side bridge) links the center of the arc-shaped inner circumferential surfaces of the sidewalls 4 of the spacers 2, and is provided on either end of the spacer 2 in the longitudinal direction, and the bridge 8d (inner-side bridge) links the center of the arc-shaped inner circumferential surfaces of the sidewalls 4 of the spacers 2, and is provided on the inner side of the spacer 2 in the longitudinal direction.

After opening the injection mold, and ejecting the resulting molded product 1, the molded product 1 is cooled in a state in which the bridges 8c and 8d are allowed to remain, and the bridges 8c and 8d are cut off thereafter.

According to this configuration, the bridges 8c and 8d that are connected to the sidewalls 4 of the spacers 2 prevent the deformation of the spacer 2 that is in a softened state immediately after ejection, and maintain the shape of the spacer 2 while the spacer 2 is cooled and solidified.

The bridges 8c and 8d that are connected to the sidewalls 4 of the spacers 2 are cut off after the spacer 2 has been sufficiently solidified so that the spacer 2 is not deformed.

In the example illustrated in FIG. 6J, the resin material may be injected from the bridges 8c provided on the ends of the spacers 2, for example.

The method for producing a water jacket spacer according to the second embodiment of the invention may utilize the injection mold in which the resin flow channel is designed so that an inter-bridge bridge is formed to link the adjacent bridges. FIGS. 7K and 7M each illustrates an example of a water jacket spacer that is produced by the method for producing a water jacket spacer according to the second embodiment of the invention using the injection mold in which the resin flow channel is designed so that the inter-bridge bridge is formed to link the adjacent bridges.

In the example illustrated in FIG. 7K, the two spacers 2 have such a shape that a plurality of arc-shaped sidewalls 4 are linked through a constricted part 3, and face each other.

The spacers 2 are produced by injection-molding a specific resin material using an injection mold in which a resin flow channel is designed so that a plurality of bridges 8a and a plurality of bridges 8b are provided along the longitudinal direction, and an inter-bridge bridge 9a is formed to link the adjacent bridges 8a, the plurality of bridges 8a being provided at such a position that the constricted parts 3 of the inner circumferential surfaces of the spacers 2 are linked by the bridge 8a, and the plurality of bridges 8b being provided at such a position that the ends of the spacers 2 are linked by the bridge 8b. The bridge 8a links the constricted parts of the spacers 2, and the bridge 8b links the ends of the spacers 2.

After opening the injection mold, and ejecting the resulting molded product 1, the molded product 1 is cooled in a state in which the bridges 8a and 8b and the inter-bridge bridge 9a are allowed to remain, and the bridges 8a and 8b and the inter-bridge bridge 9a are cut off thereafter.

According to this configuration, the bridges 8a and 8b that are connected to the constricted parts 3 of the spacers 2, and the inter-bridge bridge 9a, prevent the deformation of the spacer 2 that is in a softened state immediately after ejection, and maintain the shape of the spacer 2 while the spacer 2 is cooled and solidified.

The bridges 8a and 8b that are connected to the constricted parts 3 of the spacers 2, and the inter-bridge bridge 9a, are cut off after the spacer 2 has been sufficiently solidified so that the spacer 2 is not deformed.

In the example illustrated in FIG. 7K, the resin material may be injected from the bridges 8b provided on the ends of the spacers 2, for example. Alternatively, the resin material may be injected from a center 10a of the inter-bridge bridge 9.

In the example illustrated in FIG. 7M, the two spacers 2 have such a shape that a plurality of arc-shaped sidewalls 4 are linked through a constricted part 3, and face each other.

The spacers 2 are produced by injection-molding a specific resin material using an injection mold in which a resin flow channel is designed so that a plurality of bridges 8c and a plurality of bridges 8d are provided along the longitudinal direction, and an inter-bridge bridge 9b is formed to link the adjacent bridges 8c and 8d, or link the adjacent bridges 8d, the plurality of bridges 8c and the plurality of bridges 8d being provided around the center of the arc-shaped (when viewed from above) inner circumferential surfaces of the sidewalls 4 of the spacers 2. The bridge 8c (end-side bridge) links the center of the arc-shaped inner circumferential surfaces of the sidewalls 4 of the spacers 2, and is provided on either end of the spacer 2 in the longitudinal direction, and the bridge 8d (inner-side bridge) links the center of the arc-shaped inner circumferential surfaces of the sidewalls 4 of the spacers 2, and is provided on the inner side of the spacer 2 in the longitudinal direction.

After opening the injection mold, and ejecting the resulting molded product 1, the molded product 1 is cooled in a state in which the bridges 8c and 8d and the inter-bridge bridge 9b are allowed to remain, and the bridges 8c and 8d and the inter-bridge bridge 9b are cut off thereafter.

According to this configuration, the bridges 8c and 8d that are connected to the sidewalls 4 of the spacers 2, and the inter-bridge bridge 9b, prevent the deformation of the spacer 2 that is in a softened state immediately after ejection, and maintain the shape of the spacer 2 while the spacer 2 is cooled and solidified.

The bridges 8c and 8d that are connected to the sidewalls 4 of the spacers 2, and the inter-bridge bridge 9b, are cut off after the spacer 2 has been sufficiently solidified so that the spacer 2 is not deformed.

In the example illustrated in FIG. 7M, the resin material may be injected from the bridges 8c provided on the ends of the spacers 2, for example. Alternatively, the resin material may be injected from a center 10b of the inter-bridge bridge 9b.

The inter-bridge bridge 9 may link all of the bridges 8 formed in the injection mold (see FIG. 7M), or may link some of the bridges 8 formed in the injection mold (see FIG. 7K).

According to the second embodiment, it is possible to produce the spacer by injection molding with high productivity while preventing the deformation of the spacer 2 during the cooling step that is performed after molding.

When implementing the method for producing a water jacket spacer according to the second embodiment of the invention, the position with respect to the sidewall 4 in the height direction at which the bridges 8 are provided is not particularly limited. For example, the bridges 8 may be provided at a position that corresponds to the center of the sidewall 4 of the spacer 2 in the height direction, or may be provided at a position that is higher or lower than the center of the sidewall 4 of the spacer 2 in the height direction.

When the method for producing a water jacket spacer according to the second embodiment of the invention is used, the bridge 8 and the inter-bridge bridge 9 may serve as a runner and a gate.

The position at which the bridges 8 are provided (when the water jacket spacer is viewed from above (i.e., in a plan view)) may be appropriately designed from the viewpoint of moldability taking account of the resin flow and the like. The bridges 8 may optionally be provided at a position that corresponds to the center of the arc-shaped sidewall 4 and a position that corresponds to the constricted part 3.

In the examples illustrated in FIGS. 5, 6I, 6J, 7K, and 7M, the spacers 2 that face each other have an identical shape. Note that the method for producing a water jacket spacer according to the second embodiment of the invention is not limited thereto. The spacers 2 that face each other may have an identical shape, or may have a different shape. The spacers 2 that face each other have a different shape when the spacers 2 differ from each other as to the number of arc-shaped sidewalls that form the spacer, or when the spacers 2 differ from each other as to a member that is integrally formed on the outer side of the spacer. Note that FIG. 5 is a perspective view illustrating another example of the water jacket spacer produced in accordance with the second embodiment of the invention. FIG. 6I is a plan view illustrating the water jacket spacer illustrated in FIG. 5. FIG. 6J is a plan view illustrating another example of the water jacket spacer produced in accordance with the second embodiment of the invention. FIGS. 7K and 7M are plan views illustrating another example of the water jacket spacer produced in accordance with the second embodiment of the invention.

Figure 8A:
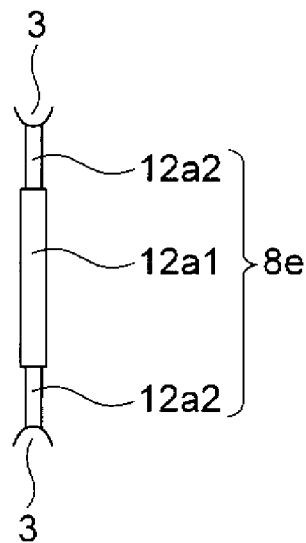
FIGS. 8A through 8D each is a schematic plan view illustrating an example of a bridge.
Figure 8B:
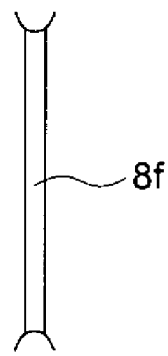
Figure 8C:
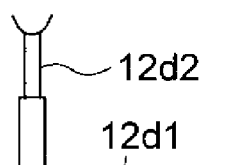
Figure 8D:
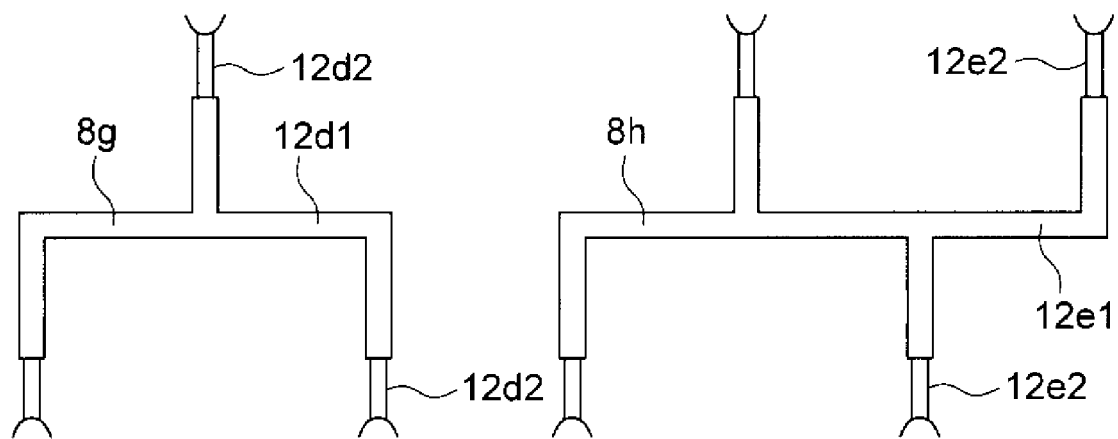

Examples of the bridge that is provided to the molded product produced by injection molding as a result of implementing the method for producing a water jacket spacer according to the second embodiment of the invention, include a bridge 8e (see FIG. 8A) that includes one linear (when viewed from above) bridge main body 12a1, and bridge thin parts 12a2 that link either end of the bridge main body 12a1 and the inner side of the constricted part of the spacer, or the inner circumferential surface of the sidewall of the spacer, a bridge 8f (see FIG. 8B) that includes only one linear (when viewed from above) bridge main body, a bridge 8g or 8h (see FIG. 8C or 8D) that includes a bridge main body 12d1 or 12e1 that includes one linear section that extends in the longitudinal direction in which the spacer extends (when viewed from above), and a branch section that branches from the section that extends in the longitudinal direction, and extends toward the inner side of the constricted part of the spacer, or the inner circumferential surface of the sidewall of the spacer, and bridge thin parts 12d2 or 12e2 that link the end of the branch section, and the inner side of the constricted part of the spacer, or the inner circumferential surface of the sidewall of the spacer, a bridge that includes one linear section that extends in the longitudinal direction in which the water jacket spacer extends (when viewed from above), and a branch section that branches from the section that extends in the longitudinal direction, and extends toward the inner side of the constricted part of the spacer, or the inner circumferential surface of the sidewall of the spacer, and the like. The bridge 8g and 8h are formed to as a bridge that links two water jacket spacers when two water jacket spacers that face each other are disposed so that the constricted parts are shifted from each other (i.e., when two water jacket spacers that face each other are disposed so that the constricted part of one of the two water jacket spacers faces the area between the constricted parts of the other of the two water jacket spacers (e.g., an area around the center of each bore)). Note that the shape of the bridge is not limited to those described above.

In the examples illustrated in FIGS. 1, 2, 4A-4H, 5, 6I, 6J, 7K and 7M, no member is formed on the outer side (i.e., the side opposite to the side that faces the bore wall BW when the spacer 1 is disposed in the water jacket WJ) of the spacer 1 for convenience of explanation. Note that various members that achieve various functions are appropriately integrally formed on the outer side of the spacer.

The resin material is not particularly limited. Examples of the resin material include polypropylene, a polyamide, polyphenylsulfone, and the likeA resin material that exhibits excellent heat resistance, water resistance, antifreeze resistance, wear resistance, and the like may be appropriately selected as the resin material.

The water jacket spacer that is produced using the method for producing a water jacket spacer according to the embodiments of the invention may be provided with an insulation rubber member and an additional member (on the inner side), and disposed in a groove-like coolant passage, or may be disposed in a groove-like coolant passage without being provided with an insulation rubber member and the like (on the inner side).

Although only some embodiments of the invention have been described in detail above, those skilled in the art will readily appreciate that many modifications are possible in the embodiments without materially departing from the novel teachings and advantages of the invention.

Although an example in which the spacer 2 having such a shape that the spacer 2 can be partially disposed in the water jacket is produced, has been described above, the invention can also similarly be applied to the case of producing a water jacket spacer that includes a plurality of segmented molded products in which a plurality of arc-shaped circumferential surfaces are linked through a constricted part. In this case, the segmented molded products are produced by injection-molding using an injection mold in which a resin flow channel is designed so that a plurality of gates are provided along the longitudinal direction at a position that corresponds to the inner circumferential surface of the segmented molded product.

Although an example in which the water jacket spacer is used for an automotive water-cooled inline four-cylinder engine has been described above, the water jacket spacer may also be applied to other inline multi-cylinder engines such as an inline three-cylinder engine. The water jacket spacer may also be applied to a V-type engine and a horizontally-opposed cylinder engine in addition to an inline engine. The water jacket spacer can be widely applied to a water-cooled internal combustion engine that is provided with a water jacket.

REFERENCE SIGNS LIST

1 Molded product
2 Spacer
3 Constricted part
4 Sidewall
6 Gate
7 Runner
7a Reinforcement member
8, 8a, 8b, 8c, 8d, 8e, 8f, 8g, 8h: Bridge
9a, 9b: Inter-bridge bridge
BW Bore wall
WJ Water jacket

The invention claimed is:

1. A method for producing a water jacket spacer that is disposed in a water jacket provided to a water-cooled internal combustion engine, and controls a flow of a coolant,
the water jacket spacer having such a shape that a plurality of arc-shaped circumferential surfaces are linked through a constricted part so that the water jacket spacer can be partially inserted into the water jacket,
the method comprising injection-molding a specific resin material using an injection mold in which a resin flow channel is designed so that a plurality of gates are provided along a longitudinal direction at a position that corresponds to an inner circumferential surface of the water jacket spacer, to obtain a molded product,
wherein, after opening the injection mold, and ejecting the molded product, the molded product is cooled in a state in which a runner that is connected to the gates is allowed to remain, and the runner is cut off thereafter.

2. A method for producing a water jacket spacer that is disposed in a water jacket provided to a water-cooled internal combustion engine, and controls a flow of a coolant,
the water jacket spacer comprising a plurality of segmented molded products in which a plurality of arc-shaped circumferential surfaces are linked through a constricted part,
the method comprising injection-molding a specific resin material using an injection mold in which a resin flow channel is designed so that a plurality of gates are provided along a longitudinal direction at a position that corresponds to an inner circumferential surface of the water jacket spacer, to obtain a molded product,
wherein, after opening the injection mold, and ejecting the molded product, the molded product is cooled in a state in which a runner that is connected to the gates is allowed to remain, and the runner is cut off thereafter.

3. The method for producing a water jacket spacer according to claim 1, wherein the runner is connected to a sidewall in a comb-like configuration.

4. The method for producing a water jacket spacer according to claim 3, wherein an angle brace-like reinforcement member is provided to a branch area of the runner.

5. The method for producing a water jacket spacer according to claim 1, wherein the gates are provided at a position that corresponds to the arc-shaped circumferential surface.

6. The method for producing a water jacket spacer according to claim 1, wherein the gates are provided at a position that corresponds to the constricted part.

7. A method for producing a water jacket spacer that is disposed in a water jacket provided to a water-cooled internal combustion engine, and controls a flow of a coolant,
the water jacket spacer having such a shape that a plurality of arc-shaped circumferential surfaces are linked through a constricted part so that the water jacket spacer can be partially inserted into the water jacket,
the method comprising injection-molding a specific resin material using an injection mold in which a resin flow channel is designed so that a space for molding two water jacket spacers is formed, and a plurality of bridges are provided along a longitudinal direction, the two water jacket spacers having an identical or different shape so that inner circumferential surfaces thereof face each other, the plurality of bridges being provided at a position that corresponds to the inner circumferential surfaces of the two water jacket spacers, to obtain a molded product,
wherein, after opening the injection mold, and ejecting the molded product, the molded product is cooled in a state in which the plurality of bridges are allowed to remain, and the plurality of bridges are cut off thereafter.

8. The method for producing a water jacket spacer according to claim 7, wherein the resin flow channel is designed so that an inter-bridge bridge is formed to link adjacent bridges among the plurality of bridges.

9. The method for producing a water jacket spacer according to claim 2, wherein the runner is connected to a sidewall in a comb-like configuration.

10. The method for producing a water jacket spacer according to claim 9, wherein an angle brace-like reinforcement member is provided to a branch area of the runner.

11. The method for producing a water jacket spacer according to claim 2, wherein the gates are provided at a position that corresponds to the arc-shaped circumferential surface.

12. The method for producing a water jacket spacer according to claim 2, wherein the gates are provided at a position that corresponds to the constricted part.

* * * * *